United States Patent [19]

Pidoux et al.

[11] 4,366,874

[45] Jan. 4, 1983

[54] DEVICE FOR MEASURING THE MAGNITUDE OF A FORCE APPLIED TO THE FREE END OF A CANTILEVER BEAM

[75] Inventors: Paul Pidoux, Bassins; Jean L. Prost, Geneva, both of Switzerland

[73] Assignee: Terraillon, Annemasse, France

[21] Appl. No.: 324,084

[22] Filed: Nov. 23, 1981

Related U.S. Application Data

[63] Continuation of Ser. No. 56,268, Jul. 10, 1979, abandoned.

[30] Foreign Application Priority Data

Jul. 14, 1978 [CH] Switzerland .......................... 7658/78

[51] Int. Cl.³ .......................................... G01G 3/142
[52] U.S. Cl. .................... 177/25; 73/862.67; 340/347 NT; 364/567; 177/211
[58] Field of Search ................. 177/211, 25, DIG. 3; 364/567, 466; 340/347 NT; 73/862.67

[56] References Cited

U.S. PATENT DOCUMENTS

| | | | |
|---|---|---|---|
| 3,616,690 | 11/1971 | Harden | 73/172 |
| 3,662,845 | 5/1972 | Pratt | 177/25 |
| 3,777,828 | 12/1973 | Dietemeyer | 177/DIG. 3 |
| 3,863,724 | 2/1975 | Dalia | 177/25 |
| 3,872,466 | 3/1975 | Wold | 340/347 NT |
| 3,951,221 | 4/1976 | Rock | 177/1 |
| 4,139,892 | 2/1979 | Gudea | 177/25 X |
| 4,181,946 | 1/1980 | Loshbough | 177/25 X |

FOREIGN PATENT DOCUMENTS

| | | |
|---|---|---|
| 2129988 | 3/1971 | France . |
| 2137126 | 5/1971 | France . |
| 2177923 | 3/1973 | France . |
| 2286374 | 9/1975 | France . |
| 1351894 | 5/1974 | United Kingdom . |
| 1433133 | 4/1976 | United Kingdom . |

OTHER PUBLICATIONS

*I.E.E.E. Spectrum,* vol. 6, No. 10, p. 85 (Oct. 1969).
*Electrotechnology,* vol. 4, No. 4, pp. 3–6 (Oct. 1976).
*Control Engineering,* vol. 24, No. 4, pp. 42–44 (Apr. 1977).
D. H. Sheingold, Editor, Analog-*Digital Conversion Notes* (Analog Devices Inc., Norwood, Mass., pp. 123–124 and 152–156 (1977).
*Electronique & Applications Industrielles,* No. 237, pp. 28 and 29 (May 1977).
*Feinwerktechnik & Messtechnik,* vol. 86, No. 1, pp. 30, 31, 32, 33, 34, and 35.

*Primary Examiner*—Joseph W. Hartary
*Attorney, Agent, or Firm*—Pennie & Edmonds

[57] ABSTRACT

The device includes: a set of four strain-gauges mounted on a cantilevered beam, which gauges are electrically connected among themselves in the form of a bridge (9), in a manner such that said bridge produces an output voltage ($\Delta V$) which is a function of the magnitude of the force applied to the beam, when the bridge (9) is supplied with current; a source of voltage (10), designed to supply the bridge (9); an analog-to-digital converter (16), connected to the output of the amplifier (14), with which there is associated a microprocessor (24); and a display unit (13), connected to an output of the microprocessor (24), which is designed to allow the display of a signal that is representative of the magnitude of the force applied to the beam.

In order to eliminate the need for auxiliary stabilizing and compensating circuits, required if a high-quality circuit of this type is to be constructed, the analog-to-digital converter (16) is of the two-slope type encompassing switching mechanisms (19, 20) controlled by the microprocessor (24) in order to use the supply voltage (10) as a reference voltage.

3 Claims, 4 Drawing Figures

DEVICE FOR MEASURING THE MAGNITUDE OF A FORCE APPLIED TO THE FREE END OF A CANTILEVER BEAM

This is a continuation, of application Ser. No. 056,268 filed July 10, 1979, now abandoned.

BACKGROUND

1. Field of the Invention

The present invention concerns a device for measuring the magnitude of a force applied to the free end of a cantilever beam. In particular, the present invention concerns the incorporation of a cantilevered beam in a weighing scale and measuring the strain in the beam when the same is subjected to the weight of an object being weighed. The measured strain is then converted to a digital read out.

2. Prior Art

U.S. Pat. No. 3,863,724 describes such a measuring circuit, which uses the signal originating from the sensor of a strain-gauge to yield a numerical result equivalent to the strain undergone. In particular, the device utilizes a conventional analog-to-digital converter.

When implementing an electronic circuit of this high-quality type, a major complication appears in the analog amplifying circuits. This is particularly true, if one must maintain great precision in terms of ambient-temperature variations, or of supply-voltage variations (if the equipment must be supplied from a battery), as well as in terms of stability in time. Indeed, this requires the insertion of voltage-stabilizing circuits and of drift-compensating circuits, and the making of many adjustments at the end of the manufacture. All these factors have an unfavorable effect on the cost of these electronics.

SUMMARY OF THE INVENTION

The object of the present invention is precisely to remedy these shortcomings at least in part, by use of an inexpensive device which makes it possible to eliminate all stabilizing and compensating circuits, as well as the adjustments otherwise necessary.

To this end, the device of the present invention includes a cantilevered beam and two pairs of strain gauges. One pair of said strain gauges is positioned on the surface of the cantilevered beam that is in tension during use (i.e. when a force is applied to the free end of the cantilevered beam) and the other of said two pairs of strain gauges is positioned on the surface of the cantilevered beam that is in compression when in use. The four strain gauges are connected together to form a bridge, which bridge produces an output voltage that is a function of the magnitude of the force supplied to the beam when the bridge is supplied with a voltage. A voltage source is supplied for the bridge and an amplifier is connected to the output of the bridge. An analog-to-digital converter is connected to the output of the amplifier. The converter is also connected to a microprocessor, which microprocessor has an output connected to a digital display which in response to the signals from the microprocessor will display a value representative of the magnitude of the force applied to the end of the cantilevered beam. Importantly, the converter is of the two-slope type and includes a pair of switches, one of which is connected to the output of the amplifier and the other of which is connected to the current input to the bridge. Both of these switches are under the control of the microprocessor by virtue of which the supply voltage itself is used as a reference voltage. Additionally, a third switch also under the control of the microprocessor is connected in the line supplying current to the bridge so that current to the bridge may be cut off during the measuring operation in order to then measure the offset voltage at the output of the amplifier.

In the device according to the invention, the only remaining adjustments are in connection with the sensor utilized, and not with the electronics. Such a device resorts simultaneously to an analog part and to a digital part, forming an indivisible whole to the extent to which the operation can only be viewed in an overall manner.

DETAILED DESCRIPTION OF THE INVENTION

Figure 1:
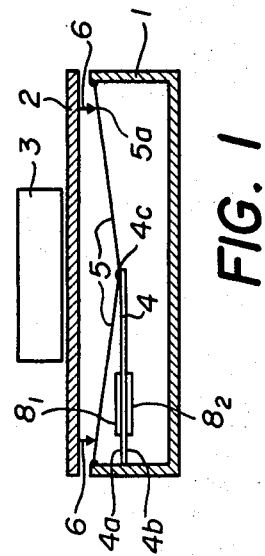
FIG. 1 is a schematic vertical sectional view of a scale of the invention.

The weighing device represented in FIG. 1 encompasses a stand 1, at the top of which there is a horizontal tray 2, designed to support the article 3, whose weight one wishes to determine. Within stand 1 there is a cantilever beam 4, one end of which is fixed in the side wall of stand 1. Beam 4 is fashioned in a manner such as to extend in substantially a horizontal position below tray 2, its free end 4c being on the same vertical centerline as the midpoint of tray 2. Between tray 2 and cantilever beam 4 there are four levers 5 (of which two only are represented in the drawing), which are mounted in articulated fashion with one of their ends on the upper part of stand 1, and with the other end on the free end 4c of beam 4; in fact, tray 2 rests on intermediate points 5a of said levers 5, by means of supporting arms 6. With this construction, the free end 4c of cantilever beam 4 is subjected to a downward vertical force which is proportional to the magnitude of the weight of an article 3 supported by the tray 2. The proportionality is a function of the relative lengths of the lever arms of the levers 5.

Figure 2:
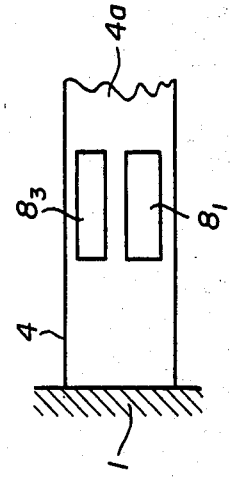
FIG. 2 is a top view, enlarged, of a detail of FIG. 1.
Figure 3:
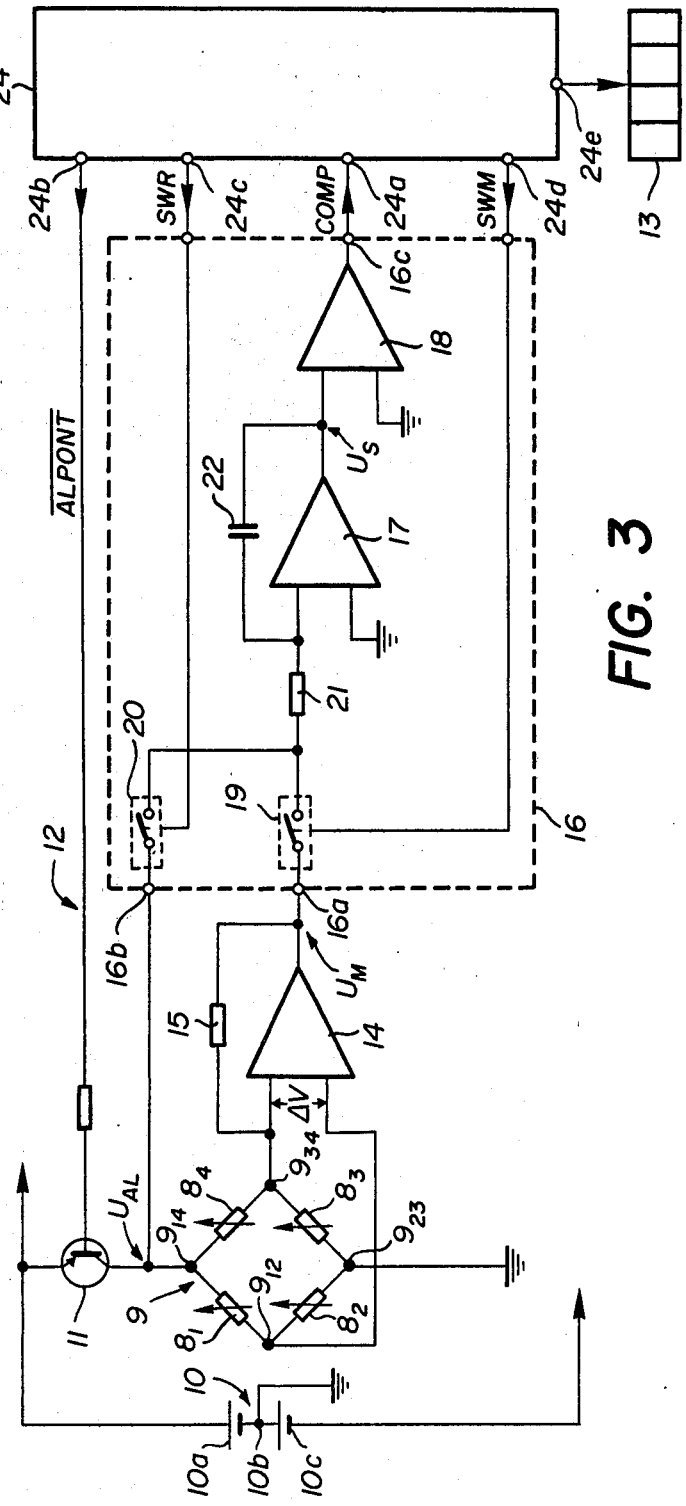
FIG. 3 is a schematic of the electronic circuit used in the scale of FIG. 1.

Cantilever beam 4 has mounted thereon four strain gauges 8 with identical resistance R. A first pair of gauges, $8_1$ and $8_3$ (FIG. 2), is mounted side by side on the upper surface $4a$ of beam 4, in a manner such as to work in tension, and a second pair of gauges $8_2$ and $8_4$, is mounted side by side on the lower surface $4b$ of beam 4, in a manner such as to work in compression. These strain gauges $8_1$ to $8_4$ (whose electrical resistance R varies as a function of the weight of article 3 placed on tray 2) are designed to be integrated into electronic circuit 12 (FIG. 3). The electronic circuit of FIG. 3 generates a digital signal representing the weight of the article, which signal is then transmitted to display unit 13.

For that purpose, strain gauges $8_1$ to $8_4$ are electrically connected among themselves in a manner such as to form a resistance bridge 9 (FIG. 3), the connections being such that gauges $8_1$ and $8_3$ make up two of the opposite sides of said bridge 9, while gauges $8_2$ and $8_4$ the two other opposite sides of the bridge. Two of the opposite vertices $9_{14}$ and $9_{23}$ of bridge 9 are thus designed to operate as input terminals of said bridge, while the two other opposite vertices 9₁₂ and 9₃₄ are designed to operate as output terminals of the bridge.

Bridge 9 is designed to be supplied by a direct-current-source, 10, whose positive pole 10a is connected to input 9₁₄ of the bridge by means of switch 11. Switch 11 consists of a transistor, whose emitter is connected to said positive terminal of the source, and whose collector is connected to said input 9₁₄ of the bridge. The midpoint 10 [of the voltage-source] is connected to the ground, as is the other input 9₂₃ of the bridge. The negative pole 10c of said voltage-source 10, as well as its positive pole 10a, are furthermore connected to the various constituent elements of circuit 12, in a manner such as to supply these elements (the connections are not represented in the drawing, but are simply sketched out by means of arrows issuing from poles 10a and 10c). So far as the two output terminals 9₂₃ and 9₃₄ of bridge 9 are concerned, they are connected to the two inputs of an amplifier 14, which is equipped with a negative-feedback resistor 15, connected between its output and that input which is connected to terminal 9₃₄.

The output of amplifier 14 is connected to one of the voltage-inputs 16a of a two-slope analog-to-digital converter 16, whose other voltage input 16b is connected to input terminal 9₁₄ of bridge 9. Said converter 16 comprises, in known fashion, an integrator 17, a comparator 18, and two electronic switches 19 and 20, all of which are arranged in the following manner: switches 19 and 20 are connected, respectively, by one of their terminals, to the respective voltage-inputs 16a and 16b of converter 16, while their other terminal is connected (through a resistor 21) to one of the inputs of integrator 17; the other input being connected to the ground. The output of integrator 17 (said integrator being equipped with a capacitor 22 connected between its output and that input that is connected to switches 19 and 20) is, for its part, connected to one of the inputs of comparator 18, whose other input is connected to the ground, and whose output constitutes the output 16c of converter 16.

Processing circuit 12 furthermore encompasses a microprocessor 24, the function of which is to control the entire circuit. The microprocessor may be, for example, the microprocessor sold under the designation TMS-1000 by Texas Instruments, Inc. The microprocessor is programable to perform the functions detailed below and includes, in known manner, a clock, program memories, data memories, and a control unit with elements capable of effecting arithmetical operations (elements which are not represented in the drawing). Said microprocessor 24 is connected, through its input 24a, to output 16c of converter 16, and by its output 24e to the display unit 13. Microprocessor 24 furthermore includes three control outputs 24b, 24c and 24d, respectively connected to the base of transistor 11, to the control of switch 20 and to the control of switch 19. Control outputs 24c and 24d have the function of triggering—at well-defined moments, to be explained further below—the opening or closing of the respective switches, 20 and 19. Control output 24b, specifically, has the function (again at well-defined moments) of either making transistor 11 conducting, so as to apply a voltage $U_{AL}$ to input-terminal 9₁₄ of bridge 9 (voltage $U_{AL}$ being substantially equal to one-half the voltage of source 10); or of blocking transistor 11, so as to apply a voltage that is substantially zero, to said input-terminal 9₁₄. (The reason that the voltage is substantially zero is that the other input 9₂₃ is grounded, and gauges 8₁ to 8₄ have low impedance).

The function of bridge 9 is to generate, whenever supplied with voltage $U_{AL}$, a voltage $\Delta V$ between its outputs 9₁₂ and 9₃₄, such that:

$$\Delta V = k U_{AL} f(\Delta R) = k U_{AL} f(P)$$

where k designates a constant, P is the magnitude of the weight of the article placed on tray 2, and $\Delta R$ is the variation in the resistance of gauges 8, caused by the presence of weight P (the value of $\Delta V$ is substantially proportional to $\Delta R$, for reasonable strains). That output voltage $\Delta V$ becomes zero whenever bridge 9 is no longer supplied (transistor 11 is blocked).

The task of amplifier 14 is to amplify voltage $\Delta V$, injected at its input, by providing at its output a signal $U_M$ such that:

$$U_M = G(\Delta V + U_{of})$$

where G and $U_{of}$ represent, respectively, the gain and the offset voltage of the amplifier. (As is known, all real amplifiers feature an offset voltage that varies as a function of a number of parameters such as supply voltage of the amplifier, ambient temperture, aging of amplifier).

Whenever bridge 9 is no longer supplied, amplifier 14 thus provides at the output a signal $U'_M$ such that:

$$U'_M = G U_{of}$$

The function of analog/digital converter 16, in turn, is to handle, jointly with processor 24, the conversion of the analog voltages $U_M$ and $U'_M$ into digital values, and to work out the difference ($U_M - U'_M$), so as to yield a result that is independent of the variable offset-voltage $U_{of}$ of the amplifier 14. In totally unexpected fashion (as will be shown further below), the use of voltage $U_{AL}$ as a reference voltage for converter 16 allows one to get rid of the error that may derive from the voltage drift of source 10; consequently, an ordinary commercial battery may be used as that voltage source, instead of having to use costly stabilized voltage supply sources. (For all practical purposes, the result of the measurement becomes independent of the voltage drift of source 10).

Operation

Figure 4:
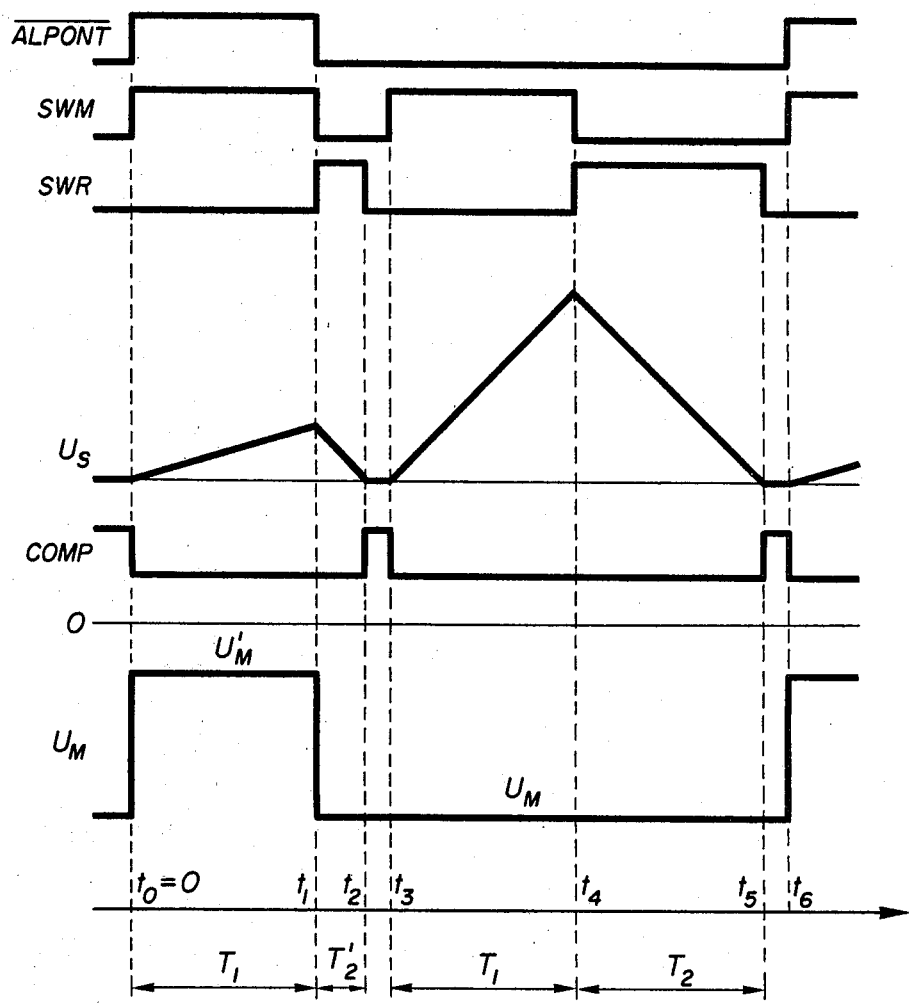
FIG. 4 is a chart explaining the various operating sequences.

The operation of the device just described is as follows: when article 3, to be weighed, is place on tray 2 of the device, tray 2 applies to the free end 4c of cantilever beam 4 a downward vertical force that is proportional to weight P of said article 3. In this fashion, gauges 8₁ to 8₄ are subjected to variation in resistance, $\Delta R$, that is a function of that weight P. The electric circuit associated with the gauge bridge 9 thereupon functions in the following manner, over an entire measuring cycle. Let us, first, call respectively, in FIG. 3 and FIG. 4, ALPONT, SWR and SWM, the signals supplied by the respective control-outputs 24b, 24c and 24d, of processor 24; $U_S$ is the signal provided at the output of integrator 17; COMP is the signal generated as the output of comparator 18; and $U_M$ is the voltage that appears at the output of amplifier 14.

At time $T_0 = 0$ (start of the measuring cycle), microprocessor 24 commands, respectively, the cutoff of the supply of bridge 9, and the closing of the measuring-switch 19 (switch 20 has remained open ever since the end of the preceding cycle). During a fixed period of time $T_1$ that had previously been set for integrator 17

(see the variation of $U_S$ in the diagram of FIG. 4), said integrator 17 thereupon proceeds to integrate the value $U'_M$, delivered by amplifier 14.

At the end of said time-period $T_1$—i.e., at time $t_1$—microprocessor 24 then commands, respectively, the supplying of bridge 9, the opening of the measuring switch 19, and the closing of the reference switch 20. Integrator 17 then proceeds, during a variable time-period $T'_2$, to discharge the stored value $U_S$; that discharge stops automatically when comparator 18 toggles at the end of said time-period $T'_2$ (i.e., at time $t_2$). At time $t_2$, microprocessor 24 commands the opening of reference-switch 20, while simultaneously proceeding to store in the memory the value $T'_2$—all this until time $t_3$.

At that moment $t_3$, microprocessor 24 commands the closing of measuring-switch 19; integrator 17 then proceeds, within the same fixed time-period $T_1$, to integrate the value $U_M$, supplied by amplifier 14.

At the end of that time-period $T_1$—i.e. at time $t_4$—microprocessor commands the opening of switch 19 and the closing of switch 20; integrator 17 proceeds, for a variable time-period $T_2$, to discharge the stored value $U_S$. That discharge stops automatically when comparator 18 toggles at the end of time-period $T_2$ (i.e., at time $t_5$). At time $t_5$, the microprocessor commands the opening of switch 20, and simultaneously takes into account the value $T_2$ supplied to it by comparator 18. The microprocessor then works out the difference $(T_2-T'_2)$, and, after processing, sends the appropriate signal to display 13, which signal is precisely representative of the weight of article 13 located on the tray 2 of the device. A short time $t_6$ after time $t_5$ (an offset necessary to let microprocessor 24 effect above-mentioned operations), the microprocessor commands the cutoff of supply to bridge 9, and the closing of measuring-switch 19, so that the circuit is ready to carry out another measuring cycle.

The signal supplied by microprocessor 24 to display 13 is quite representative of the weight P of article 3, since above-mentioned operations made it possible to suppress the parasite signal due to the offset voltage $U_{of}$ of amplifier 14. This signal is particularly representative of weight P, since it turns out to be completely independent of any possible fluctuations in supply voltage $U_{AL}$ (and hence of the voltage of source 10), as we shall now prove.

Let use call $R_1$ and C, respectively, the values of resistor 21 and the capacitance of capacitor 22, associated with integrator 17. The value $U_S$ worked out by integrator 17 then follows, respectively, during the time period contained between times $t_0$ and $t_2$, the equation:

$$U_S = \frac{1}{R_1 C} \int_0^{T_1} U'_M = \frac{1}{R_1 C} \int_0^{T'_2} U_{AL} \tag{1}$$

and, during the time period contained between times $t_3$ and $t_5$, the equation:

$$U_S = \frac{1}{R_1 C} \int_0^{T_1} U_M = \frac{1}{R_1 C} \int_0^{T_2} U_{AL} \tag{2}$$

Since the frequency of repetition of the measuring cycle is chosen so as to be significantly greater than the drift of the values $U_{AL}$ and $U_{of}$ (hence that of the values $U_M$ and $U'_M$), equation (1) may also be written:

$$U'_M = U_{AL} \frac{T'_2}{T_1} \tag{1'}$$

In analogous fashion, equation (2) may also be written:

$$U_M = U_{AL} \frac{T_2}{T_1} \tag{2'}$$

Subtracting one equation from the other, one obtains:

$$(U_M - U'_M) = U_{AL} \frac{T_2 - T'_2}{T_1} \tag{3}$$

and by replacing $U_M$ and $U'_M$ by their previously indicated expressions:

$$[G(\Delta V + U_{of}) - GU_{of}] = U_{AL} \frac{T_2 - T'_2}{T_1} \tag{4}$$

or $$G\Delta V = kGU_{al}f(P) = U_{AL} \frac{T_2 - T'_2}{T_1} \tag{4'}$$

Hence the final equation:

$$\frac{T_2 - T'_2}{T_1} = kGf(P) \tag{5}$$

Equation (5) clearly shows that the value $(T_2-T'_2)$ that is supplied to the display is representative of weight P, and that it no longer depends either on the offset voltage $U_{of}$ of amplifier 14, or on the supply voltage $U_{AL}$ (hence on the voltage of source 10).

The device just described offers numerous advantages, among which one could cite the following:
total absence of devices for adjusting the offset voltage of the amplifiers;
unaffected by any variation in such offset voltages, caused by variations in the temperature, or in the supply voltage, or by a long-term drift in the amplifiers;
elimination of stabilizing circuits for the voltage supplied to the measuring bridge, due to the self-compensating nature of the measurement.

Such a device is therefore particularly suited for equipment that is to be supplied by batteries.

Of course, the device according to the invention is not limited to above-mentioned weighing application; instead, it can be used in any application utilizing resistive sensors (which could be other than strain gauges), whose output voltage is proportional to the effect to be measured. Thus, the use of temperature sensors, or of any other appropriate type of sensor, could be considered.

We claim:
1. A device for measuring the magnitude of a force, comprising:
 (a) a deflectable beam;
 (b) a beam suppport, the deflectable beam being connected to the beam support so that a length of the beam can be deflected by a force applied to the beam;

(c) a plurality of strain gauges affixed to the beam, the strain gauges being electrically interconnected to form a strain-gauge bridge circuit, the bridge circuit having an electrical-energy input and a strain signal output, the strain-gauge bridge circuit being adapted to produce a strain signal at the strain signal output in response to deflection of the beam on which the strain gauges are affixed when the bridge circuit is energized by electrical energy applied to the electrical-energy input, the strain-signal being a measure of the force deflecting the beam;

(d) a strain-signal amplifier having a signal input and a signal output, the signal input of the strain-signal amplifier being connected to the strain-signal output of the strain-gauge bridge circuit;

(e) a switchable-input, integrate-and-compare circuit having:

(e.1) two signal inputs; an unknown-signal input connected to the signal output of the strain-signal amplifier, and a reference-signal input connected to the electrical-energy input of the strain-gauge bridge circuit;

(e.2) a signal integrator having an integrator input and an integrated-signal output;

(e.3) electronically-controlled signal switch means having a switch-control input and interconnecting the unknown-signal input, the reference-signal input, and the integrator input, for selectively connecting the integrator input to the unknown-signal input or to the reference-signal input in response to switch control signals applied to the switch-control input; and (e.4) a comparator having a test-signal input, a comparison-reference input, and a comparator output, the test signal input being connected to the integrated-signal output of the integrator and the comparison-reference input being connected to a comparison reference, so that in operation the comparator generates a crossover-time signal at the comparator output when an algebraic difference between the comparison reference and an integrated signal from the integrator changes sign;

(f) a microprocessor having a clock, an input port, and output ports, an output port being connected to the switch-control input of the signal switch means of the integrate-and-compare circuit so that the integrator input of the integrate-and-compare circuit can be selectively connected to the unknown signal input or to the reference-signal input in response to switch control signals from the microprocessor, and an input port of the microprocessor being connected to the comparator output of the integrate-and-compare circuit so that in operation the microprocessor can determine a digital signal-level number representative of an analog-signal level applied to the unknown-signal input of the integrate-and-compare circuit by steps comprising: directing that a first signal input of the integrate-and-compare circuit be connected to the integrator input for a predetermined time interval, subsequently directing that a second signal input be connected to the integrator input, and digitally measuring a time interval between connection of the second signal input to the integrator input and a crossover-time signal from the comparator;

(g) a bridge-energy supply terminal connectable to an electrical-energy source for the strain-gauge bridge circuit;

(h) an electronically controlled bridge-energization interrupter switch having a switch-control input connected to an output port of the microprocessor, the bridge-energization interrupter switch being connected between the bridge-energy supply terminal and the electrical-energy input of the strain-gauge bridge circuit to permit the electrical energy supplied to the strain-gauge bridge circuit to be interrupted in response to switch-control signals from the microprocessor to enable an error signal at the signal output of the strain-signal amplifier when the electrical energy supplied to the strain-gauge bridge circuit is interrupted to be applied to the unknown-signal input of the integrate-and-compare circuit so that in operation a corrected strain-signal number representative of a strain signal from the strain-gauge bridge circuit amplified by the strain-gauge amplifier corrected for the error signal can be determined by the microprocessor; and (i) a numeric display connected to an output port of the microprocessor for displaying a corrected strain-signal number for the microprocessor representative of the force applied to the beam.

2. The device according to claim 1 further comprising:

(j) an unregulated electrical-energy source connected to the bridge-energy supply terminal for supplying electrical energy to the strain-gauge bridge circuit.

3. The device according to claim 2 in which the unregulated electrical-energy source is a battery.

* * * * *

UNITED STATES PATENT AND TRADEMARK OFFICE
CERTIFICATE OF CORRECTION

PATENT NO. : 4,366,874

DATED : January 4, 1983

INVENTOR(S) : Paul Pidoux and Jean L. Prost

It is certified that error appears in the above—identified patent and that said Letters Patent is hereby corrected as shown below:

Column 4, line 63, "$T_0$" should read --$t_0$--.

Column 8, line 44, "for" should read --from--.

Signed and Sealed this

Seventeenth Day of May 1983

[SEAL]

Attest:

DONALD J. QUIGG

Attesting Officer    Acting Commissioner of Patents and Trademarks